Nov. 14, 1933.　　　　H. B. RING　　　　1,934,885
SOLDERING IRON
Filed June 22, 1933　　4 Sheets-Sheet 1
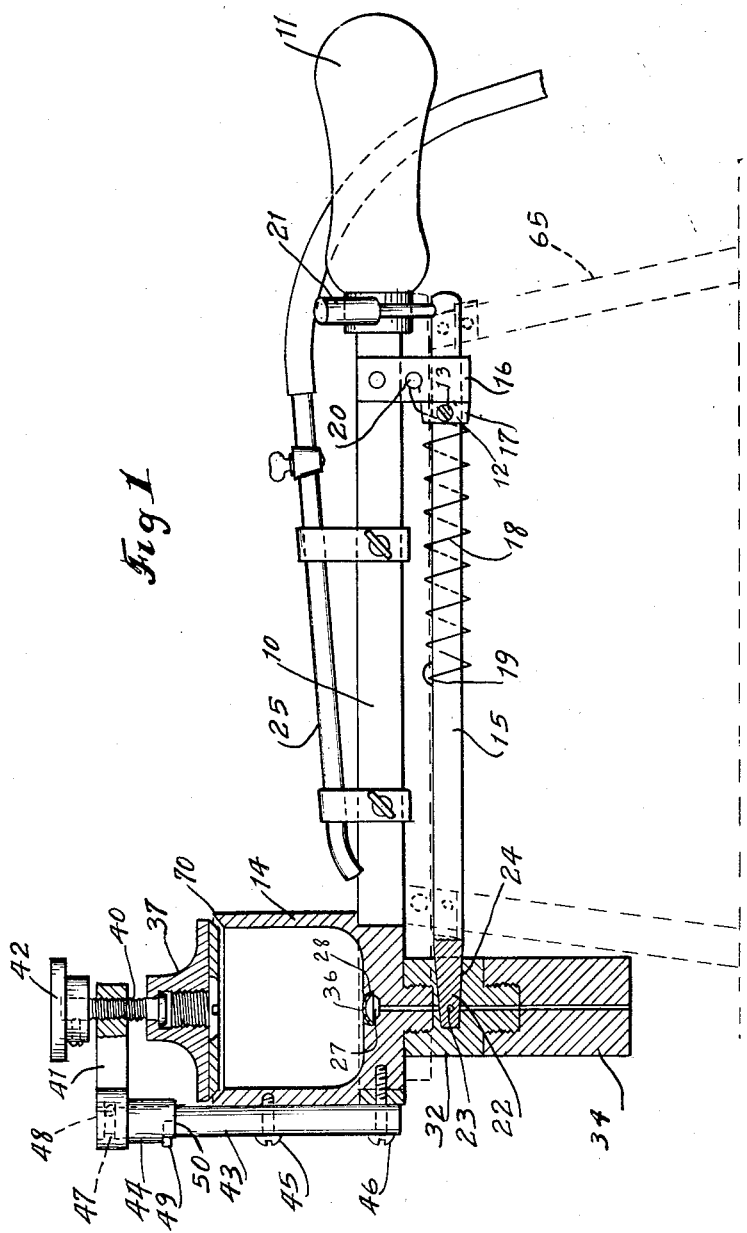
INVENTOR-
Harold B. Ring
BY
ATTORNEY-

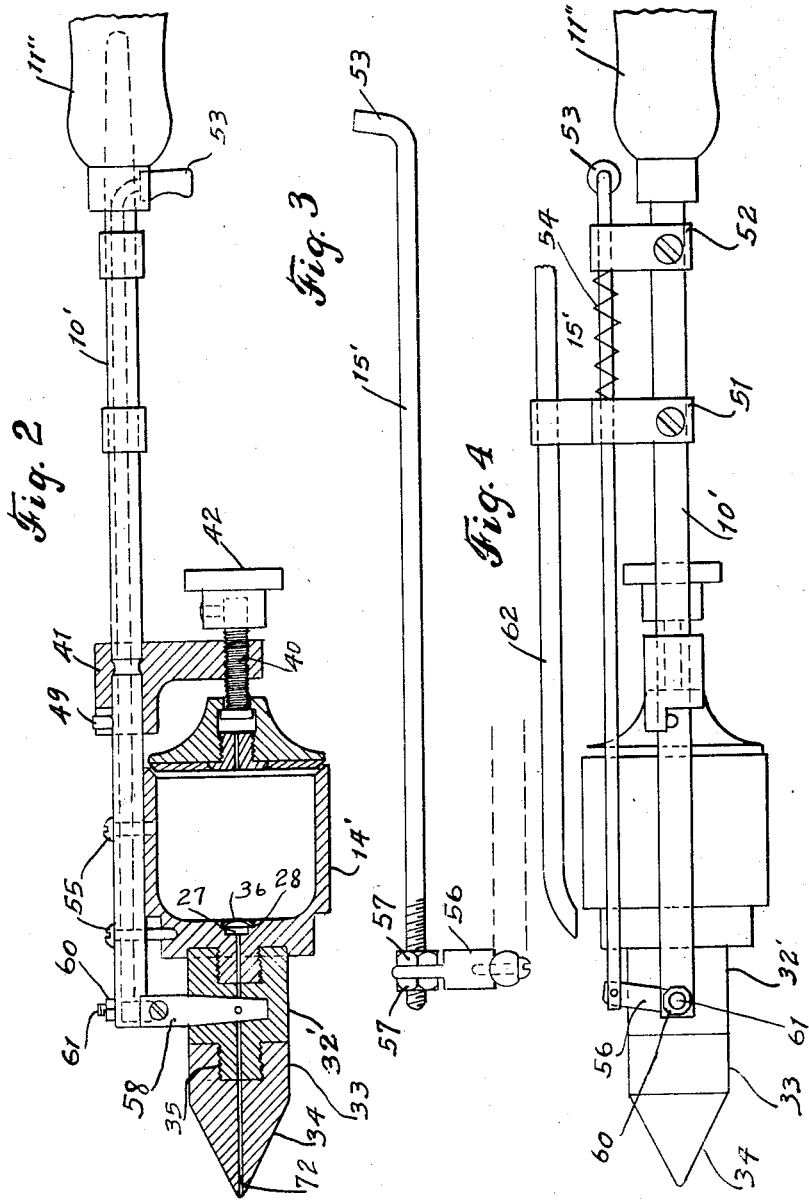

Nov. 14, 1933.   H. B. RING   1,934,885
SOLDERING IRON
Filed June 22, 1933   4 Sheets-Sheet 3
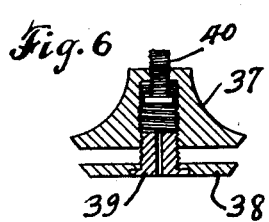
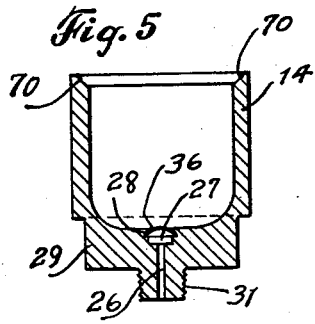
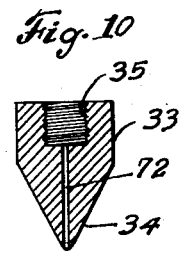
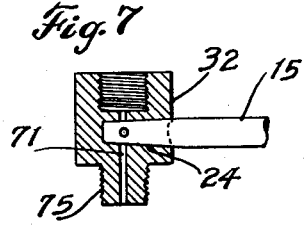
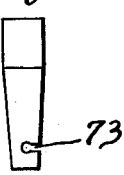
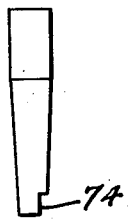
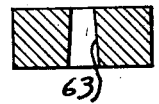
INVENTOR-
Harold B. Ring
BY
Peter M. Boesen
ATTORNEY- Nov. 14, 1933.   H. B. RING   1,934,885
SOLDERING IRON
Filed June 22, 1933   4 Sheets-Sheet 4

INVENTOR-
Harold B. Ring
BY
ATTORNEY-

Patented Nov. 14, 1933

1,934,885

UNITED STATES PATENT OFFICE 1,934,885

SOLDERING IRON

Harold B. Ring, Brooklyn, N. Y.

Application June 22, 1933. Serial No. 677,030

5 Claims. (Cl. 113—109)

This invention relates to new and useful improvements in soldering irons and accessories used in connection therewith, and it has for its main object the provision of a soldering iron, which is comparatively simple of construction, durable, of a convenient and most suitable shape, and very easy to manipulate in the performance of soldering work.

The present invention constitutes further improvements of an invention, for which the U. S. application for patent was filed by me, as a joint inventor, May 3, 1933, under Ser. No. 669,110.

The parts, comprising the essential features of this device, are arranged in such a manner that the said device will not easily get out of working order, contrary to the devices now commonly known, which latter are usually more or less crowded with mechanical parts impracticably arranged in the interior, and in connection with the inner chamber and channels of such devices.

On account of the arrangement of the parts in my new device, and the comparatively exterior position of the said parts or controlling elements, the latter permit themselves to be embodied in a stronger form, thereby constituting a more substantial structure than it would otherwise have been possible to provide, if all of the said elements had been arranged within the apparatus.

At the same time important improvements have been made, as shown herein, in regard to placement stands for the device, when in use; a variety of new valves have been constructed and shown; and an illustration of one of the many ways in which this soldering iron may be heated, is included in the drawings.

In view of the aforesaid desirable form of construction, it is estimated that the cost of manufacturing will be very small.

With the above and other objects in view, this invention consists of the novel features of construction, combination and arrangement of parts, hereinafter fully described, claimed and illustrated in the accompanying drawings forming part of this specification, and in which similar characters of reference indicate corresponding parts in all views, and in which:

Figure 1 is an elevational view of my device, partly in section, showing a detachable screw-threaded tip or soldering point; and also showing in dotted lines the said device supported by the stand illustrated in Figures 14 and 15.

Figure 2 is a similar view of my device in a slightly modified form, that is, with the container for the soldering material in a horizontal position, or parallel with the handle.

Figure 3 shows the operating handle proper of the device, while

Figure 4 shows the device in Figure 2 in a turned position.

Figure 5 shows a transverse sectional view of the container, especially illustrating the features of the bottom part in the latter.

Figure 6 shows the relative arrangement of the parts, constituting the top of the lid.

Figure 7 shows the specific arrangement of the valve-system of the container, while Figures 8 and 9 show different constructions of a valve.

Figure 10 shows a soldering point.

Figure 11 shows an especially convenient form of soldering material, and

Figures 12 and 13 show an apparatus for picking up the latter.

Figures 14 and 15 show a placement stand for the apparatus illustrated in Figure 1, while

Figure 14:
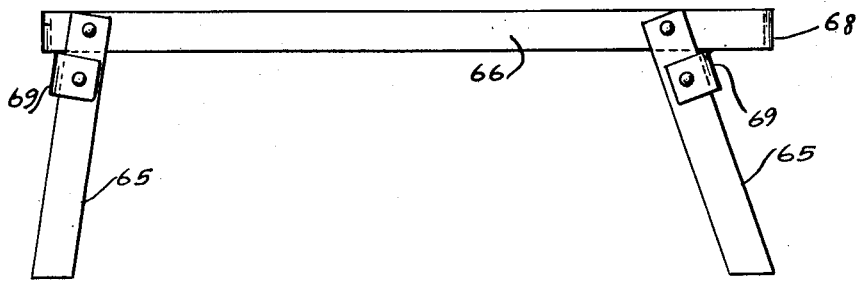

Referring more particularly to the drawings, 10 indicates a substantially flat bar, which has one end provided with a handle 11, and the other end made to form a seat for the container 14. Below the bar 10 is arranged a controlling bar, or rod, 15, made preferably of steel, with a very small co-efficient of expansion. A bracket 16 solidly attached to the bar 10, and having an opening 17 at its lower end, forms a seat for the said controling bar 15, which is turnable in the said seat, and is held in a certain fixed position by means of a coiled spring 18 mounted between a screw 19 on the bar 15 and a screw 20 on the said bracket; a handle 21 attached to the end of the said bar 15 serves to turn the latter and regulate and control the flow of the soldering material from the receptacle 14.

In order to regulate the said controlling bar 15, a ring 12 is mounted upon the latter, and adjusted by means of the small screw 13.

The end portion of the controlling bar 15 is tapered, as shown at 22 to form a valve, with a central bore 23 therein adapted to register with a channel in the valve-seating part of the container, as will be hereinafter more fully described, and which will easily be observed from the drawings. The said tapered end-portion is seated in a correspondingly formed opening 24, made in, but not penetrating, the said valve-seating part of the container.

Above the flat bar 10 and attached to the latter is secured the conventional means for heating the soldering container, the gas, or gasoline conveying tube 25 of the said means being arranged in a slanting position, as shown.

The construction of the soldering container may appropriately be noted from the disclosures in the drawings, Figures 1, 5, 6 and 7; of which Figure 6 is an exploded view of the lid, or cover, showing the relative arrangement of the different parts, while Figure 5 merely illustrates a bottom-view of the container.

Thus in the said views, 14 indicates a cylindrical container, or the receptacle proper, which is formed with upper conical edge portions 70 for co-operation with the lid.

At the bottom of the said container 14, which has a channel, or fine opening 26 through its center, is formed a depression 27, the upper side-walls 28 of which are downwardly flaring in order to receive and hold a sieve-member 36, seated in and sprung into place in the said depression, and serving to prevent any particles or dirt from gathering in or clogging up the said channel 26. In this connection, I, however, reserve to myself the right under the circumstances to change the said bottom arrangement to meet conditions at hand.

The lower part 29 of the container 14 has been formed with a projection 31 to engage and fit a detachable valve-seating section 32, made of appropriately expansible steel, and having formed therein a central aperture 71, and, as formerly described, a tapered opening, or valve-seat 24. This valve, however, is extending only a short distance past the vertical center line of the said section 32, which may clearly be noted, especially in Figure 7. On the lower end of the said part 32 is in turn mounted a soldering point or tip 33, made of copper and having preferably two of its sides tapered, as shown at 34. The said tip 33 may have a neck portion adapted to be inserted into the valve-seating section, or a reduced portion 35 to receive a projection 75 upon the latter.

While the valve shown in Figure 7 is provided with a central bore, modified forms of valves may well be used. Thus I have shown in Figures 8 and 9 valves formed with cut-out portions 73 and 74.

The lid of the container 14, comprises a member 37 formed with somewhat conical lower edge-portions; the lower surface of the said lid being covered by a plate-member 38, which may be bent around the said edge-portions, or be held in place by a screw-member 39. The upper part of the member 37 is adapted to receive a regulation screw 40, which is arranged, and preferably threaded through a swingable arm 41, as shown in Figure 1, and in turn adjusted by means of the knob 42. The said arm 41 has a downwardly projecting sleeve-portion 44, and is pivotally mounted upon an upright 43, which in turn is secured to the container and seat of the latter by screws 45 and 46. The said upright is provided with an annular groove near its top, as shown at 47 in dotted lines, the said annular groove is in turn engaged by a screw-bolt 48 through the said arm 41.

In order to secure a preferable range of side-wise movement of the said lid, the sleeve 44 has at its lower end been provided with a cut-away portion 50, equal to 180 degrees of its circumference, while the upright 43 has been formed with a stopper 49 adapted to cooperate with said cut-away portion in sidewise movement of the lid.

In the modification shown in Figures 2 and 4, the container, or receptacle 14' is flush with the bar 10', which supports the apparatus, that is more specifically to say, that the container is arranged longitudinally, or parallel to the said bar; the latter has a handle 11', while two brackets 51 and 52 are attached to it by means of screws; the said brackets being at their lower ends provided with openings for seating turnably therein the controlling rod-member 15'.

The said rod-member terminates at one end in the minor knob, or handle 53, while it is actuated by a spring 54, secured in any suitable manner. The bar 10' has the receptacle 14' secured to it by means of screw bolts 55, 55; this end of the bar serving also as a support for the controlling arrangement of the valve-system.

The said receptacle and its relevant part correspond substantially to these formerly described and shown in Figure 1.

The controlling rod-member 15' is, however, in this embodiment of my device connected to a short lever 56, having nuts 57 screwed tightly unto both sides of the latter; the said lever is in turn connected to the tapered valve 58 and secured to the latter; a stop nut 60 and a regulation screw 61 provides the means for properly adjusting the said valve; the latter penetrating the valve-seating section 32', as formerly described, only to slightly beyond the center line thereof.

A heat-conveying tube is herein indicated by 62.

In Figure 11 has been shown a block of soldering material, especially made to fit the container, or receptacle of this apparatus. The said block has been found very desirable, as it has been formed with a slightly tapered opening 63 at its center in order that it may easily be lifted, or removed; in addition the form of this block has the advantage that it will cause the soldering material to melt most easily.

Figures 12 and 13 show an apparatus, comprising two springy forked members 64 and 64, this apparatus is easily manipulable and especially adapted to pick up the soldering material to be placed in the container.

Figure 15:
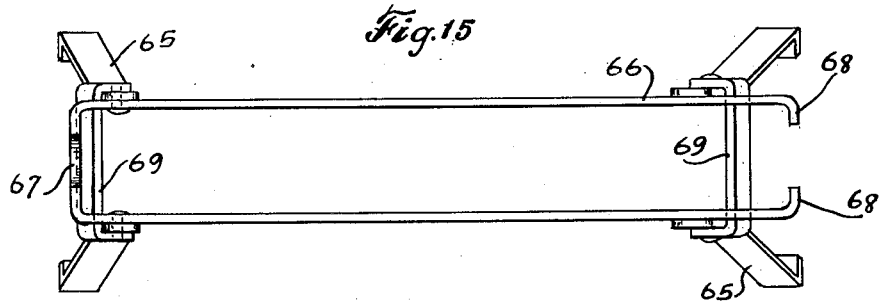

In Figures 14 and 15 are shown a placement stand for supporting the device in use, as shown in Figure 1; the said placement stand being shown in dotted lines in Figure 1; this stand has four legs 65, one end of the legs being bent upon itself to form a supporting base, while the other end of the legs is pivotally secured to a horizontal bar 66; the latter bar is bent upon itself to form the actual support of the soldering apparatus, and has with this end in view been formed with a cut-out portion 67 of a rounded form at one end, and with hook members 68 upon the other end. The front legs shown to the right in Figure 15 are arranged a short distance from the said hook members to provide a seat for the container unit of the soldering apparatus in the gap thus formed. It will appear evident that this stand may be folded up, when not in use.

Figure 16:
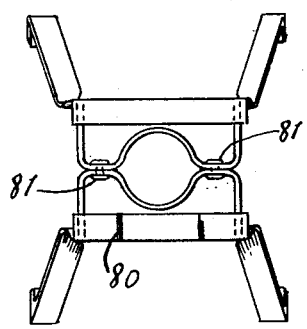
Figure 16 shows a placement stand for the apparatus illustrated in Figures 2 and 4.
Figure 17:
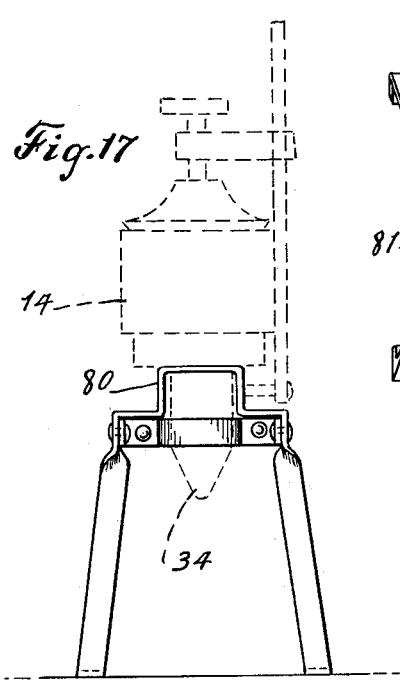
Figure 17 shows the apparatus or device actually placed upon the said stand; the apparatus being shown herein in dotted lines.

In Figures 16 and 17 have been shown a similar device for use in connection with the soldering apparatus shown in Figures 2 and 4. This stand, while built on somewhat similar principles, as the one shown in Figures 14 and 15, is however constructed in such a manner that the center bars are formed with an upwardly extending angular section 80, as shown in Figure 17, while the stand also differs from the one formerly shown in that it may be taken apart by means of a detachable hinge arrangement, as shown at 81.

In the placement stand shown in the Figures 14 and 15 cross bars 69 are arranged between and secured to the legs in order to steady the apparatus in operation, and lock it in position.

It is obvious that changes may be made in the form, construction and arrangement of the several parts, as shown, within the scope of the appended claims, and without departing from the spirit of the invention, and I do not therefore wish to limit myself to the exact construction and arrangement shown and described herein.

What I claim, as new, and desire to secure by Letters Patent of the United States, is:—

1. A device of the class described, comprising, in combination, a handle bar, a container supported by the latter, a controlling bar arranged below the first bar and being turnably mounted in a bracket, the latter being secured to the said handle bar, an actuating spring mounted upon the controlling bar, and being secured thereto by a screw upon the latter and upon the said bracket, respectively, and an operating handle integral with the said controlling bar, an upright solidly attached to the container, a horizontal member formed with a depending sleeve-portion, the said sleeve-portion being turnably mounted upon the upright, and means for regulating the movement of the horizontal member, relative to the said upright, a lid carried by the horizontal member, the container being formed with slanting edge portions, and having at its bottom a small chamber with downwardly flaring walls, a sieve-member mounted in the said chamber in position relative to the said flaring walls, a detachably cylindrical member secured to the bottom of the container, and a member with a suitable operating surface attached to the said cylindrical member, the respective parts of the container being formed with a centrally arranged and registering outlet-channel from the container, therein.

2. A device, as claimed in claim 1, and having the detachable cylindrical member formed with a tapered valve-seat therein, adapted to receive a valve rod, the said valve-seat extending a short distance beyond the outlet channel to one side; the cylindrical member being made of a material having a larger co-efficient of expansion than that of the said rod.

3. A device, as claimed in claim 1, and wherein the member with the operable soldering surface has the latter formed with two downwardly tapered sides.

4. A device of the class described, comprising, in combination, a handle bar, a container supported by the latter, a controlling bar arranged below the first bar and being turnably mounted in a bracket, the latter being secured to the said handle bar, an actuating spring mounted upon the controlling bar, and an operating handle integral with the latter, an upright secured to the container and being formed at its upper end with an annular groove, and a stopper upon its cylindrical body portion, a horizontal member formed with a depending sleeve portion having a 180 degree circumference of its lower edge portion cut away for cooperation with the said stopper, the said horizontal member being formed with a vertical opening therein to receive a spindle connected to a lid, and having on its side a crosswise arranged aperture, a bolt inserted in the latter and cooperating with the groove in the said upright, the container being formed with conically shaped edge portions, and having a detachable cylindrical member secured to the bottom thereof, the said cylindrical member being formed with a tapered valve-seat therein, the latter extending a short distance beyond the central vertical line of the said cylindrical member, and a member with a suitable operating surface attached to the said cylindrical member, the respective parts being formed with centrally arranged and registering outlet channels therein.

5. A soldering apparatus comprising, in combination, a handle bar, a container supported by the latter, a controlling bar arranged in connection with and being secured to the handle bar, an actuating spring mounted upon the controlling bar and an operating handle integral with the latter, an adjustable nut and screw mounted upon the controlling bar for regulating the valve action, a supporting rod secured to the container, a crosswise arranged member formed with a depending sleeve portion being turnable mounted upon the said supporting rod, and means for regulating the movement of the supporting rod relative to the crosswise member, a lid carried by the crosswise member, the said lid comprising a member formed with conically shaped edge portions and having a bottom plate mounted thereon, a screw securing the latter parts together, and a screw turnably projecting through the crosswise member and cooperating with the first said member of the lid, and a knob upon the said screw, the container being formed with slanting edge portions, and having a detachable cylindrical member secured to the bottom thereof, the said cylindrical member being formed with a tapered valve-seat therein, the latter extending only a short distance beyond the central vertical line of the said cylindrical member, and a second member with a suitable operating surface attached to the said cylindrical member, the respective parts of the container being formed with centrally arranged and registering outlet channels therein.

HAROLD B. RING.